US008438390B2

(12) United States Patent
Perez

(10) Patent No.: US 8,438,390 B2
(45) Date of Patent: May 7, 2013

(54) METHOD AND SYSTEM FOR USING NEIGHBOR DISCOVERY UNSPECIFIED SOLICITATION TO OBTAIN LINK LOCAL ADDRESS

(75) Inventor: Maria Perez, Half Moon Bay, CA (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 329 days.

(21) Appl. No.: 12/975,439

(22) Filed: Dec. 22, 2010

(65) Prior Publication Data

US 2012/0166798 A1    Jun. 28, 2012

(51) Int. Cl.
*H04L 9/32* (2006.01)
*G06F 9/00* (2006.01)

(52) U.S. Cl.
USPC ............................................. 713/168; 726/14

(58) Field of Classification Search .......... 713/150, 713/153, 154, 160, 162, 168; 726/13, 14; 711/202; 370/389, 392; 709/225, 227, 230, 709/231, 238
See application file for complete search history.

(56) References Cited

U.S. PATENT DOCUMENTS

| | | | |
|---|---|---|---|
| 7,739,497 B1 * | 6/2010 | Fink et al. ..................... | 713/162 |
| 8,018,928 B2 * | 9/2011 | Parameswaran et al. ..... | 370/389 |
| 8,219,800 B2 * | 7/2012 | Levy-Abegnoli et al. .... | 713/154 |
| 8,261,062 B2 * | 9/2012 | Aura et al. ..................... | 713/162 |
| 8,266,427 B2 * | 9/2012 | Thubert et al. ................ | 713/162 |
| 2008/0307516 A1 * | 12/2008 | Levy-Abegnoli et al. ........ | 726/9 |

* cited by examiner

*Primary Examiner* — Nathan Flynn
*Assistant Examiner* — Abdullah Almamun
(74) *Attorney, Agent, or Firm* — Bachanan Ingersoll & Rooney PC

(57) ABSTRACT

A system that facilitates enhancing security for a computer device by obtaining a link layer address of an IPv6 IPsec address. The system including a computer device having a software module, which performs the following steps: capturing multicast addresses and solicited multicast addresses for one or more IPv6 IPsec addresses; calculating the computer device identifier from the one or more multicast addresses and solicited multicast addresses; storing the computer device identifier for the one or more multicast addresses and solicited multicast addresses; sending a neighbor solicitation to one or more of the IPv6 IPsec addresses as a tentative target address simulating double address detection; capturing the neighbor advertisement response from the one or more IPv6 IPsec addresses and calculating a link-layer identifier; generating a neighbor cache with the link-layer identifier; and enabling IPv6 IPsec communication with the one or more IPv6 IPsec addresses using the link-layer identifier.

24 Claims, 3 Drawing Sheets

METHOD AND SYSTEM FOR USING NEIGHBOR DISCOVERY UNSPECIFIED SOLICITATION TO OBTAIN LINK LOCAL ADDRESS

FIELD OF THE INVENTION

The present invention relates to a method and system for using neighbor discovery unspecified solicitation to obtain a link local address, and more particularly to a method and system that facilitates enhancing security for a computer device by obtaining a link layer address of a target node using Neighbor Discovery unspecified solicitation to enable IPv6 IPsec communication between nodes and/or computer devices.

BACKGROUND OF THE INVENTION

Networks have enhanced our ability to communicate and access information by allowing one personal computer to communicate over a network (or network connection) with another personal computer and/or other networking devices, using electronic messages. When transferring an electronic message between personal computers or networking devices, the electronic message will often pass through a protocol stack that performs operations on the data within the electronic message (e.g., packetizing, routing, flow control).

The first major version of addressing structure, Internet Protocol Version 4 (IPv4), is still the dominant protocol of the Internet, although the successor, Internet Protocol Version 6 (IPv6) is being deployed actively worldwide. The IPv6 network protocol provides that IPv6 hosts or host devices (e.g., image forming apparatuses and other devices) can configure themselves automatically (i.e., stateless address autoconfiguration) when connected to an IPv6 network using ICMPv6 neighbor discovery messages. When first connected to a network, an IPv6 host sends a link-local multicast neighbor solicitation request advertising its tentative link-local address for double address detection (dad) if no problem is encountered the host uses the link-local address.

In addition, it can be appreciated that most network interfaces come with an embedded IEEE Identifier (i.e., a link-layer MAC address), and in those cases, stateless address autoconfiguration (IPv6 protocol) uses the IEEE identifier to generate a 64-bit interface identifier. By design, the interface identifier is likely to be globally unique when generated in this fashion. The interface identifier is in turn appended to a prefix to form the 128-bit IPv6 address. The first-half 64 bits are allocated to a network prefix included in router advertisement (RA) from the router. The second-half 64 bits are allocated to a EUI-64 format interface ID as a 64-bit identifier decided by the IEEE. In the EUI-64 format interface ID, the Media Access Control address (MAC address) is encapsulated. In 64 bits of the entire interface ID, the first 24 bits are allocated to a number indicating a manufacturer administrated by the IEEE, the next 16 bits are allocated to "FFFE", and the last 24 bits are allocated to an expanded identification number managed by the manufacturer.

It can be appreciated that any IPv6 capable device with stateless addressing including image forming apparatuses (e.g., Multi-Function Peripherals (MFP) and printers) typically will include a unique identifier or Media Access Control address (MAC address). The MAC address is assigned to network adapters or network interface cards (NICs) by the manufacturer for identification, and used in the Media Access Control protocol sublayer of the Internet Protocol Version 6 (IPv6). If assigned by the manufacturer, a MAC address usually encodes the manufacturer's registered identification number. It can be appreciated that the MAC address can also be known as an Ethernet Hardware Address (EHA), hardware address, adapter address, or physical address.

Internet Protocol Security (IPsec) is a protocol suite for securing Internet Protocol (IP) communications by authenticating and encrypting each IP packet of a communication session. In addition, IPsec includes protocols for establishing mutual authentication between agents (or nodes) at the beginning of a session and negotiation of cryptographic keys to be used during the session. IPsec is an end-to-end security scheme operating in the Internet Layer of the Internet Protocol Suite, and can be used in protecting data flows between a pair of hosts (host-to-host), between a pair of security gateways (network-to-network), or between a security gateway and a host (network-to-host). However, current protocols do not allow the enabling of an IPv6 IPsec communication between two nodes based on direct neighbor solicitations.

Accordingly, it would be desirable to have a method and system that facilitates enhancing security for a computer device by obtaining a link layer address of a target node using Neighbor Discovery unspecified solicitation to enable IPv6 IPsec communication between nodes and/or computer devices.

OBJECTS AND SUMMARY

In consideration of the above issues, it would be desirable to have an software module or software application associated with a computer device or host device such as an image forming apparatus, which facilitates enhanced security for a computer device by obtaining a link layer address of a target node using Neighbor Discovery unspecified solicitation to enable IPv6 IPsec communication between nodes and/or computer devices.

In accordance with an exemplary embodiment, a system that facilitates enhancing security for a computer device by obtaining a link layer address of an IPv6 IPsec address, comprises: a computer device, the computer device having a software module, which performs the following steps: capturing multicast addresses and solicited multicast addresses for one or more IPv6 IPsec addresses, each of the one or more multicast addresses and solicited multicast addresses having a computer device identifier associated therewith; calculating the computer device identifier from each of the one or more multicast addresses and solicited multicast addresses; storing the computer device identifier for each of the one or more multicast addresses and solicited multicast addresses; sending a neighbor solicitation to one or more of the IPv6 IPsec addresses as a tentative target address simulating double address detection; capturing the neighbor advertisement response from the one or more IPv6 IPsec addresses and calculating a link-layer identifier for each of the one or more IPv6 IPsec addresses; generating a neighbor cache with the link-layer identifier for each of the one or more IPv6 IPsec addresses; and enabling IPv6 IPsec communication with the one or more IPv6 IPsec addresses using the link-layer identifier.

In accordance with another exemplary embodiment, a method for facilitating enhanced security for a computer device by obtaining a link layer address of an IPv6 IPsec address, comprises: capturing multicast addresses and solicited multicast addresses for one or more IPv6 IPsec addresses, each of the one or more multicast addresses and solicited multicast addresses having a computer device identifier associated therewith; calculating the computer device identifier from each of the one or more multicast addresses and solicited multicast addresses; storing the computer device identifier for each of the one or more multicast addresses and solicited multicast addresses; sending a neighbor solicitation to one or more of the IPv6 IPsec addresses as a tentative target address simulating double address detection; capturing the neighbor advertisement response from the one or more IPv6 IPsec addresses and calculating a link-layer identifier for each of the one or more IPv6 IPsec addresses; generating a neighbor cache with the link-layer identifier for each of the one or more IPv6 IPsec addresses; and enabling IPv6 IPsec communication with the one or more IPv6 IPsec addresses using the link-layer identifier.

In accordance with a further exemplary embodiment, a computer program product comprising a non-transitory computer usable medium having a computer readable code embodied therein for controlling a computer device, the computer readable program code configured to cause the computer device to enhancing security for the computer device by obtaining a link layer address of a target node using neighbor discovery unspecified solicitation, the process comprising the steps of: capturing multicast addresses and solicited multicast addresses for one or more IPv6 IPsec addresses, each of the one or more multicast addresses and solicited multicast addresses having a computer device identifier associated therewith; calculating the computer device identifier from each of the one or more multicast addresses and solicited multicast addresses; storing the computer device identifier for each of the one or more multicast addresses and solicited multicast addresses; sending a neighbor solicitation to one or more of the IPv6 IPsec addresses as a tentative target address simulating double address detection; capturing the neighbor advertisement response from the one or more IPv6 IPsec addresses and calculating a link-layer identifier for each of the one or more IPv6 IPsec addresses; generating a neighbor cache with the link-layer identifier for each of the one or more IPv6 IPsec addresses; and enabling IPv6 IPsec communication with the one or more IPv6 IPsec addresses using the link-layer identifier.

It is to be understood that both the foregoing general description and the following detailed description are exemplary and explanatory and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
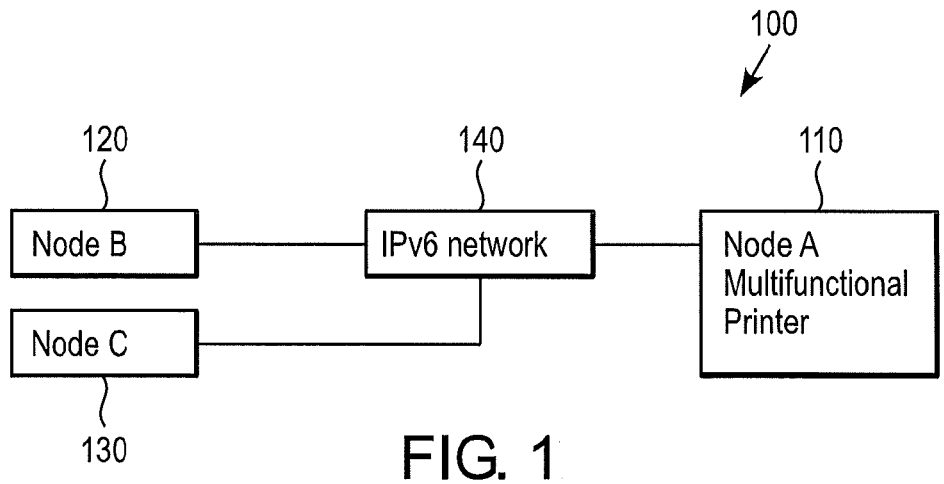
FIG. 1 is an illustration of a network printing system in accordance with an exemplary embodiment.

Reference will now be made in detail to the present preferred embodiments of the invention, examples of which are illustrated in the accompanying drawings. Wherever possible, the same reference numbers are used in the drawings and the description to refer to the same or like parts.

FIG. 1 shows a network system 100, which includes a host device (node A) 110 and one or more second hosts or client devices (node B and node C) 120, 130. The host device (node A) 110 and the one or more second hosts (node B and node C) 120, 130 are connected to each other through an IPv6 communication network 140 in a state capable of performing data communications. It can be appreciated that in accordance with an exemplary embodiment, the hosts 110, 120, 130 can be any network device, which supports an IPv6 communication protocol (Internet Protocol version 6). Examples of communication networks 140 consistent with embodiments of the invention include, but are not limited to, the Internet, an Intranet, a local area network (LAN) and a wide area network (WAN). The host device (or image forming apparatus) 110 and the one or more second hosts (or client devices) 120, 130 can be connected with a wire or can be connected with a wireless connection by using radio frequency (RF), infrared (IR) transmission, USB, IEEE1394 and/or other suitable wireless technology.

It can be appreciated that in accordance with an exemplary embodiment, the host device (node A) 110 may be embodied by a printer, an image forming apparatus, a Multi-Function Peripheral (MFP) and other known image forming apparatuses, which prints an image on a printing medium (or a recording medium) such as a sheet of paper based on printing data generated by the one or more second hosts (or node B and node C) 120, 130. In accordance with an exemplary embodiment, the host device (or node A) 110 is a Multi-Function Peripheral (MFP), which includes at least a copy function, an image reading function, and a printer function, and forms an image on a sheet based on a print job (print instruction) sent from the one or more second hosts (or nodes B and C) 120, 130, image data read by an image reading section, such as a scanner, provided in the host device (or node A) 110, or the like.

In accordance with an embodiment, the one or more second hosts (nodes B and C) 120, 130, which may be embodied by a computer system, and generates the printing data usable in the host device (node A) 110 and transmits the generated printing data to the host device (node A) 110. An example of the one or more second hosts (nodes B and C) 120, 130 may include a computer and/or a portable device such as a notebook personal computer, a cellular phone and a personal digital assistant (PDA). The host device (node A) 110 and the one or more second hosts (nodes B and C) 120, 130 can constitute an image forming system to install a communication port, to generate printing data, and to perform a printing operation of forming an image on a printing medium according to the printing data.

It can be appreciated that the one or more second hosts (nodes B and C) 120, 130 can be a plurality of personal computers, and has the function of sending a print job to the first host device 110 in the form of an image forming apparatus. A printer driver program (hereinafter, sometimes simply referred to as a printer driver) is installed in the second host 120, and the one or more second hosts 120, 130 uses the function of the printer driver to generate a print job including the data of print conditions to be applied at the time of image formation, image data, and the like, and to send the generated print job to the first host device 110 in the form of an image forming apparatus.

It can be appreciated that each of the host devices 110, 120, 130 preferably include a Media Access Control Identifier (or MAC ID), which is a globally unique identifier assigned to each of the host devices 110, 120, 130. The MAC ID is also often referred to as a hardware or physical address. It can be appreciated that MAC IDs (or addresses) are typically 6-byte (48-bits) in length, and written in a MM:MM:MM:SS:SS:SS format. The first 3-bytes are an identification or ID number of the manufacturer, which is assigned by an Internet standards body. The second 3-bytes are a serial number assigned by the manufacturer.

In IPv4, hosts were originally configured manually. Later, host configuration protocols like DHCP (Dynamic Host Configuration Protocol) enabled servers to allocate IP addresses to hosts that joined the network. However, IPv6 takes this a step further, by defining a method for IPv6 capable devices, such as image forming apparatuses to automatically configure their IP addresses and other parameters without the need for a server. Unfortunately, this also provides some security risks to devices from hackers and the like. Although, IPv6 also defines methods whereby the IP addresses on a network can be renumbered (changed en masse), it can be appreciated that it would be desirable to be able to use neighbor solicitation with an unspecified address to obtain the link layer address as if the node (i.e., device or apparatus) were performing double address detection (DAD) for a host device 110, so as to enable IPv6 IPsec between two nodes which is not possible to obtain direct neighbor solicitations under the IPv6 protocol. It can be appreciated that the system and methods as described herein are not limited to computer devices or image forming apparatuses, and can be extended to other apparatuses including any device having Media Access Control Identifiers (or MAC IDs) and/or any IPv6 capable device with stateless addressing.

In the IPv6 protocol, the generation of an IP address (or IPv6 address) for an image forming device or other apparatus/device is defined in RFC 2462, entitled "IPv6 Stateless Address Autoconfiguration." The IPv6 stateless autoconfiguration utilizes several features in IPv6, including link-local addresses, multicasting, the Neighbor Discovery (ND) protocol, and the ability to generate the interface identifier of an address from the underlying data link layer address (or MAC ID). A computer device or image forming apparatus generates a temporary address until it can determine the characteristics of the network it is on, and then create a permanent address it can use based on that information. It can be appreciated that a host device or image forming apparatus when using stateless autoconfiguration generates a link-local address, which is one of the two types of local-use IPv6 addresses. The link-local addresses has "1111 1110 10" for the first ten bits. The generated address uses those ten bits followed by 54 zeroes and then the 64 bit interface identifier, which will typically be derived from the data link layer (MAC) address.

Once the generated address is created, a Link-Local Address Uniqueness Test (or Double address detection (DAD)) can be used to test and to ensure that the generated address is not for some reason already in use on the local network. However, it can be appreciated that this is very unlikely to be an issue if the link-local address came from a MAC address. The device or apparatus (i.e., node) sends a Neighbor Solicitation message using the Neighbor Discovery (ND) protocol, and listens for a Neighbor Advertisement in response that indicates that another device is already using its link-local address; if so, either a new address must be generated, or autoconfiguration fails and another method must be employed. It can be appreciated that pursuant to RFC 4861, the Neighbor Advertisement is sent to all-nodes multicast, and the link-layer address must be included when responding to multicast solicitations.

Assuming the uniqueness test passes, the device or apparatus assigns the link-local address (i.e., Link-Local Address Assignment) to its IP interface. This address can be used for communication on the local network, however, it cannot be used on the wider Internet (or communication network), since link-local addresses are not routed.

The node next attempts to contact a local router for more information on continuing the configuration. This is done either by listening for Router Advertisement messages sent periodically by routers, or by sending a specific Router Solicitation to ask a router for information on what to do next. The router also provides direction to the node on how to proceed with the autoconfiguration. The router can tell the node that on this network "stateful" autoconfiguration is in use, and tell the host that the address of a DHCP server to use. Alternately, the router will tell the host how to determine its global Internet address.

Assuming that stateless autoconfiguration is in use on the network, the host will configure itself with its globally-unique Internet address, This globally-unique address is generally formed from a network prefix provided to the host by the router, combined with the device's identifier as generated in the first step. It can be appreciated that when using the protocol stateless addressing (stateless autoconfiguration) for IPv6, which is required by the IPv6 Ready Logo Program, the link-local addresses and global addresses are determined by concatenating an identifier unique to the adapter. For example, in generating an IPv6 address, an image forming apparatus having an adapter with a MAC ID of: A0:4B:08:D2:CE will have a link-local address of Fe08:2a0:4bff:fe08:d2ce/64. Thus, when a MAC address broadcast is sent out, each network interface card on the local area network will see the broadcast address and automatically pass the information up to the upper layers of the OSI model. It can be appreciated that typically, the MAC ID or interface identifier will not change as long as the physical hardware adapter is not changed.

Figure 2:
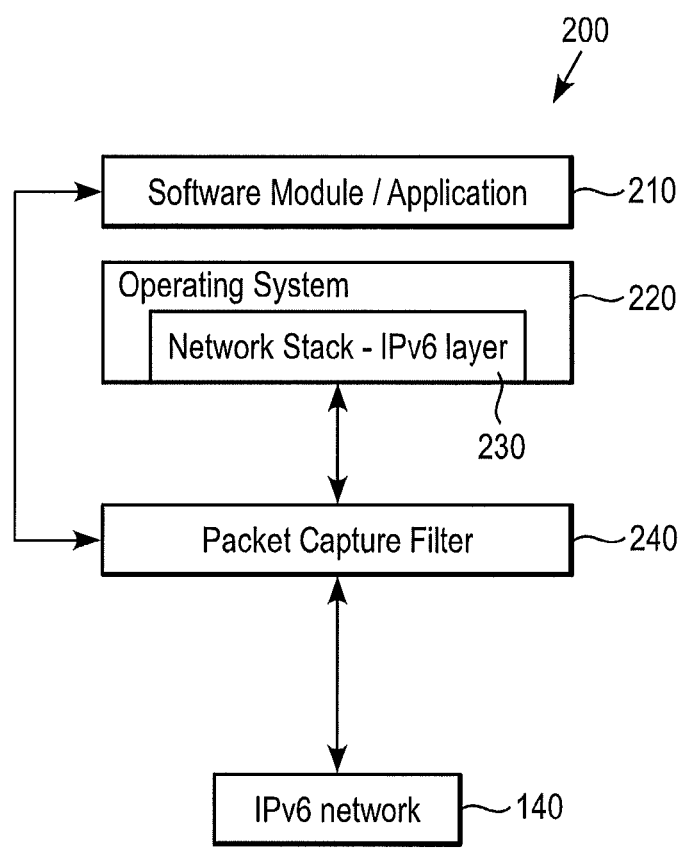
FIG. 2 is an illustration of an implementation of a software module, which facilitates enhancing security for a computer device by obtaining a link layer address of a target node using neighbor discovery unspecified solicitation in accordance with an exemplary embodiment.

FIG. 2 is a schematic illustration of a computer device in the form of an computer device (or node) 200 having a software module 210, which enhances security for a computer device by obtaining a link layer address of a target node using neighbor discovery unspecified solicitation to enable IPv6 IPsec between nodes and/or computer devices. As shown in FIG. 2, the computer device (or node) includes a software module 210, which captures multicast addresses and solicited multicast addresses for one or more IPsec addresses, and wherein each of the multicast addresses and the solicited multicast addresses has a computer device identifier associated therewith. In accordance with an exemplary embodiment, the device (or node) 200 includes a network filter 210 for capturing the multicast addresses and the solicited multicast addresses for one or more IPsec addresses. The network filter 210 preferably stores the multicast addresses and solicited multicast addresses in a neighbor cache table for retrieval by the software module (or application) 210.

In accordance with an exemplary embodiment, the software module (or application) 210 calculates (or determines) the computer device identifier from each of the one or more multicast addresses and solicited multicast addresses, and stores the computer device identifier for each of the multicast addresses and solicited multicast addresses. It can be appreciated that in accordance with an exemplary embodiment, the computer device identifier for each node is a media access control identifier (or "MAC ID"). It can be appreciated that the multicast address and the solicited multicast addresses are an all nodes multicast address and solicited mode multicast for each IPsec address. In accordance with an exemplary embodiment, the multicast addresses and the solicited multicast addresses are Neighbor Solicitation and Neighbor advertisement packages, respectively. In addition, the network filter is preferably configured to target Neighbor Solicitation and Neighbor advertisement packages.

It can be appreciated that once the software module 210 has ascertained the computer device identifier for the plurality of one or more computer devices, the software module 210 sends a Neighbor Solicitation message with an unspecified address for each of the plurality of IPsec addresses as a tentative target address simulating double address detection and listens for a neighbor advertisement response that indicates that another device (or node) is already using the corresponding link-local address. The software module 210 captures each of the neighbor advertisement responses, and based upon the responses received from the devices (or nodes), the software module calculates and stores a link-layer identifier for each of the neighbor advertisement responses.

The software module 210 is also configured to generate a neighbor cache with the link-layer identifier, including the media access control identifier (MAC ID) for IPsec communication with an IPv6 IPsec address (or target node), which enables the computer device 200 to establish IPv6 IPsec communication with the IPv6 IPsec address (or target node). It can be appreciated that in accordance with an exemplary embodiment, the computer device 200 stores the media access control identifier (MAC ID) for each of the Neighbor Solicitations with unspecified addresses on a neighbor cache table. In a preferred embodiment, the software module 210 creates a temporary neighbor cache entry upon enabling IPsec communication between the computer device and the target node. Thus, upon enabling of the IPv6 IPsec communication between the computer device and the one or more IPv6 IPsec addresses (or target nodes), the software module 210 can delete the temporary neighbor cache entry.

As shown in FIG. 2, the software module 210 is preferably an application level module, which enhances security for a computer device by obtaining a link layer address of a target node using neighbor discovery unspecified solicitation to enable IPv6 IPsec between nodes and/or computer devices. It can be appreciated that in a stateless address autoconfiguration, the IPv6 globally-unique address is generally formed from a network prefix provided to the computer device (or image forming apparatus) by the router, combined with the computer device's identifier as generated in forming the link-local address.

In accordance with an exemplary embodiment, the software module 210 captures the IPv6 globally-unique address using a packet capture filter (or IP filter) 240. The packet capture filter 240 captures the outgoing and/or incoming IPv6 packets from the Network Stack 230 within the operating system 220 of the image forming apparatus 200. The packet capture filter 240 then forwards the IPv6 packet to the software module 210, where the link layer address is obtained. It can be appreciated that the software module 210 preferably captures the IPv6 packet during the initial broadcast (i.e., link-local address uniqueness test and global address DAD) by the target node. It can be appreciated that all IPv6 addresses will go through the same process of Double address detection (DAD), even if the node's link local address does not have problems with double address detection.

In accordance with an exemplary embodiment, the multicast address and solicited mode multicast address are configured using a stateless autoconfiguration IPv6 address, which is configured at least partially based on a computer device identifier (or image forming apparatus identifier). In accordance with an exemplary embodiment, the software module 210 further sends the outgoing IPv6 packet with the modified IPv6 address to at least one second host device (or target node) 120 (FIG. 1) via an IPv6 communication network 240.

The operating system (OS) of the computer device (or image forming apparatus), which acts as an interface between hardware and user is responsible for the management and coordination of activities and the sharing of the resources within the image forming apparatus. In accordance with an exemplary embodiment, the operating system 220 of the computer device (or image forming apparatus) 200, and the network layer 230 is under or a part of the operating system. It can be appreciated that by utilizing a software module 210 as described herein, the operating system 220 of the image forming apparatus 200 does not need to be altered or changed in anyway.

Figure 3:
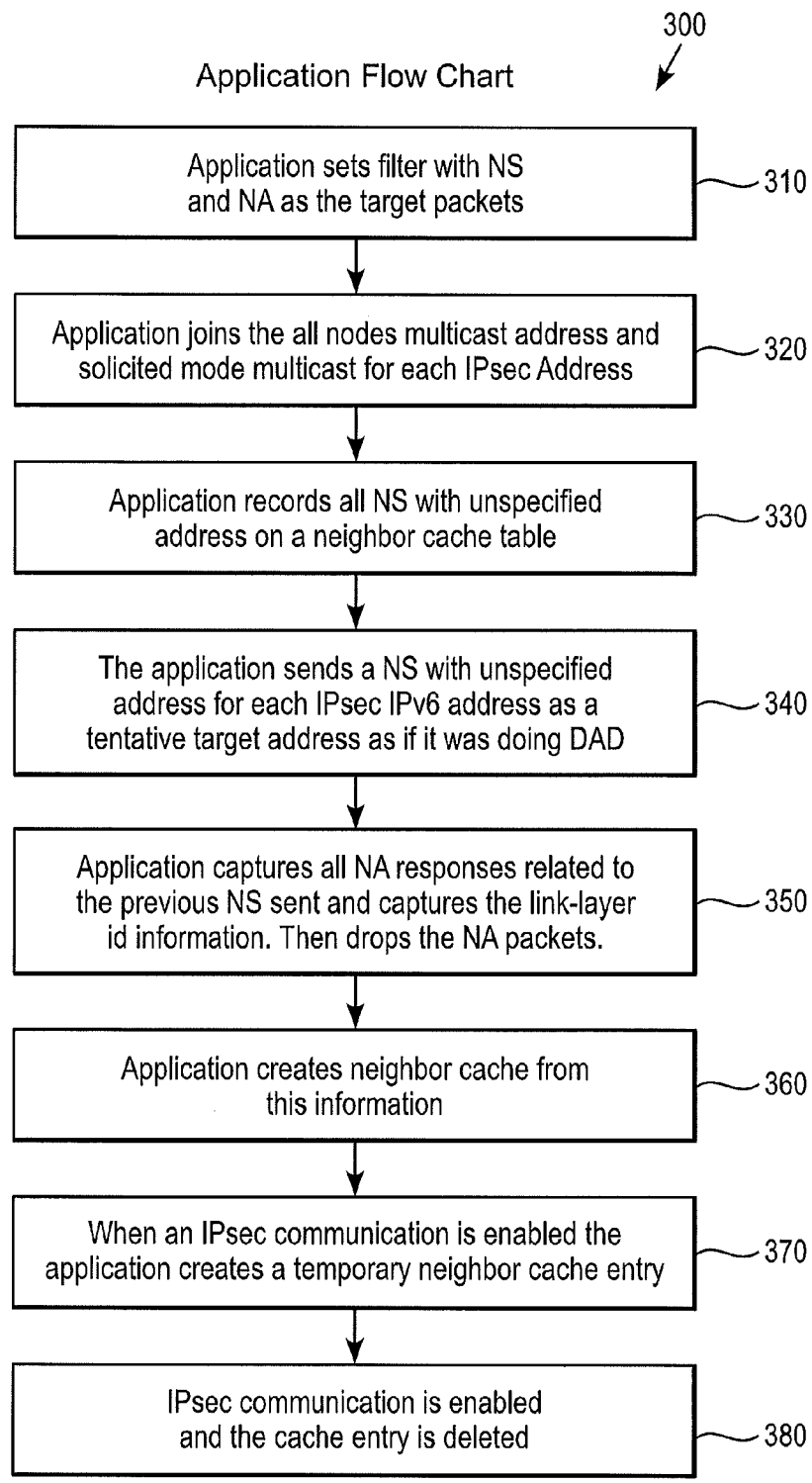
FIG. 3 is a flow chart of an implementation of a software module, which facilitates enhancing security for a computer device by obtaining a link layer address of a target node using neighbor discovery unspecified solicitation in accordance with another exemplary embodiment.

FIG. 3 is a flow chart of an implementation of a software module 300, which facilitates enhancing security for a computer device by obtaining a link layer address of a target node using neighbor discovery unspecified solicitation in accordance with another exemplary embodiment. As shown in FIG. 3, in step 310, the software module (or application) sets an IP filter with a Neighbor Solicitation and neighbor advertisement as a desired target. In accordance with an exemplary embodiment, in step 320, the software module joins the all nodes multicast address and solicited mode multicast for each IPsec Address pursuant to the neighbor discovery protocol (as set forth by RFC 4861). In step 330, the software module records all Neighbor Solicitations with unspecified IP addresses on a neighbor cache table. The software module in step 340 sends a Neighbor Solicitation with unspecified addresses for each IPsec IPv6 address as a tentative target addresses as if the software module was performing a double address detection (DAD) protocol. In step 350, the software module captures all neighbor advertisements related to the previously sent Neighbor Solicitations and captures the link-layer identifier information associated with the neighbor advertisements. The software module then drops each of the neighbor advertisements. In step 360, the software module creates a neighbor cache from the link-layer identifier information obtained from the neighbor advertisements. In step 370, when an IPsec communication is enabled, the software module creates a temporary cache entry. In step 380, once the IPsec communication is enabled, the temporary cache entry, which was created in step 370 is deleted.

Figure 4:
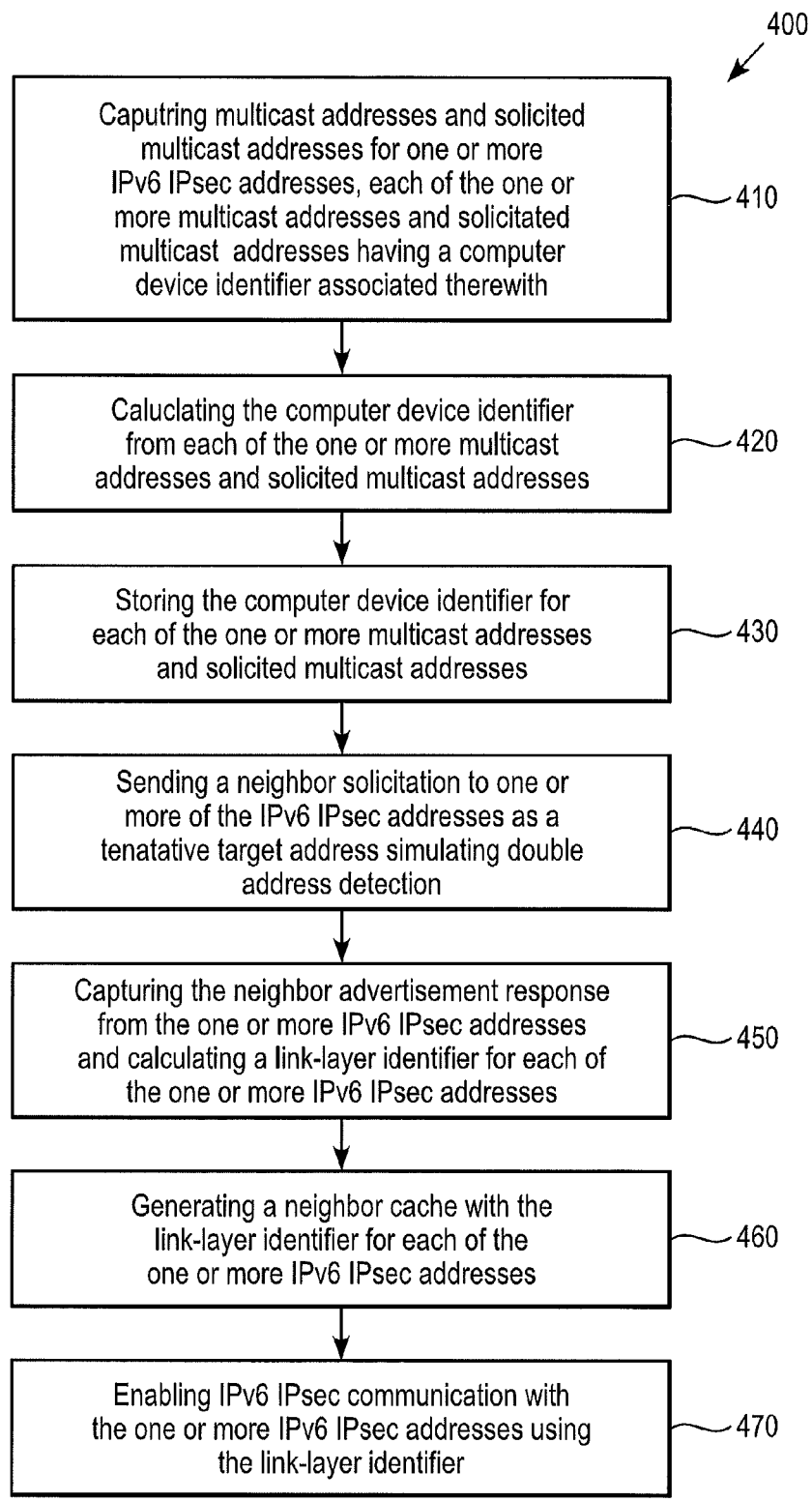
FIG. 4 is a flow chart of another implementation of a software module, which facilitates enhancing security for a computer device by obtaining a link layer address of a target node using neighbor discovery unspecified solicitation in accordance with an exemplary embodiment.

FIG. 4 is a flow chart of another implementation of a software module which facilitates enhancing security for a computer device by obtaining a link layer address of a target node using neighbor discovery unspecified solicitation in accordance with an exemplary embodiment. As shown in FIG. 4, in step 410 the system includes a software module, which captures multicast addresses and solicited multicast addresses for one or more IPv6 IPsec addresses, each of the multicast addresses and solicited multicast addresses having a computer device identifier associated therewith. In step 420, the computer device identifier from each of the one or more multicast addresses and solicited multicast addresses is calculated. In step 430, the computer device identifier for each of the one or multicast addresses and solicited multicast addresses is stored. The software module in step 440 sends a neighbor Solicitation with an unspecified address for each of the one or more IPv6 IPsec addresses as a tentative target address simulating double address detection. In step 450, each of the neighbor advertisement responses, which are generated in response to the neighbor Solicitation are captured and in step 460, a link-layer identifier for each of the neighbor advertisement responses is calculated and stored in temporary cache. In step 470, a neighbor cache with the link-layer identifier for IPv6 IPsec communication with one or more of the IPv6 IPsec addresses (or target node) is established. Once the link-layer identifier for the target is obtained, the computer device can enable IPv6 IPsec communication with the one or more IPv6 IPsec addresses (or target node) when desired.

In accordance with another exemplary embodiment, a computer program product comprising a non-transitory computer usable medium having a computer readable code embodied therein for controlling a computer device, the computer readable program code configured to cause the computer device to enhancing security for the computer device by obtaining a link layer address of a target node using neighbor discovery unspecified solicitation, the process comprising the steps of: capturing multicast addresses and solicited multicast addresses for one or more IPv6 IPsec addresses, each of the one or more multicast addresses and solicited multicast addresses having a computer device identifier associated therewith; calculating the computer device identifier from each of the one or more multicast addresses and solicited multicast addresses; storing the computer device identifier for each of the one or more multicast addresses and solicited multicast addresses; sending a neighbor solicitation to one or more of the IPv6 IPsec addresses as a tentative target address simulating double address detection; capturing the neighbor advertisement response from the one or more IPv6 IPsec addresses and calculating a link-layer identifier for each of the one or more IPv6 IPsec addresses; generating a neighbor cache with the link-layer identifier for each of the one or more IPv6 IPsec addresses; and enabling IPv6 IPsec communication with the one or more IPv6 IPsec addresses using the link-layer identifier.

The computer usable medium, of course, may be a magnetic recording medium, a magneto-optic recording medium, or any other recording medium which will be developed in future, all of which can be considered applicable to the present invention in all the same way. Duplicates of such medium including primary and secondary duplicate products and others are considered equivalent to the above medium without doubt. Furthermore, even if an embodiment of the present invention is a combination of software and hardware, it does not deviate from the concept of the invention at all. The present invention may be implemented such that its software part has been written onto a recording medium in advance and will be read as required in operation.

It will be apparent to those skilled in the art that various modifications and variation can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A system that facilitates enhancing security for a computer device by obtaining a link layer address of an IPv6 IPsec address, comprising:
a computer device, the computer device having a software module, which performs the following steps:
capturing multicast addresses and solicited multicast addresses for one or more IPv6 IPsec addresses, each of the one or more multicast addresses and solicited multicast addresses having a computer device identifier associated therewith;
calculating the computer device identifier from each of the one or more multicast addresses and solicited multicast addresses;
storing the computer device identifier for each of the one or more multicast addresses and solicited multicast addresses;
sending a neighbor solicitation to one or more of the IPv6 IPsec addresses as a tentative target address simulating double address detection;
capturing the neighbor advertisement response from the one or more IPv6 IPsec addresses and calculating a link-layer identifier for each of the one or more IPv6 IPsec addresses;
generating a neighbor cache with the link-layer identifier for each of the one or more IPv6 IPsec addresses; and
enabling IPv6 IPsec communication with the one or more IPv6 IPsec addresses using the link-layer identifier.

2. The system of claim 1, further comprising a network filter for capturing the one or more multicast addresses and solicited multicast addresses for the one or more IPv6 IPsec addresses.

3. The system of claim 2, further comprising targeting neighbor solicitation and neighbor advertisement packages with network filter.

4. The system of claim 1, wherein the one or more multicast addresses and solicited multicast addresses is an all nodes multicast address and solicited mode multicast for each IPv6 IPsec address.

5. The system of claim 4, wherein the one or more multicast addresses and solicited multicast addresses are neighbor solicitation packages and neighbor advertisement packages, respectively.

6. The system of claim 5, further comprising storing a media access control identifier (MAC ID) for each of the neighbor solicitation packages on a neighbor cache table.

7. The system of claim 6, further comprising creating a temporary neighbor cache entry upon enabling IPv6 IPsec communication between the computer device and the one or more IPv6 IPsec addresses.

8. The system of claim 7, wherein upon enabling of the IPsec communication between the computer device and the target node, deleting the temporary neighbor cache entry.

9. The system of claim 1, wherein the computer device identifier is a Media Access Control identifier (MAC ID).

10. The system of claim 1, wherein the software module is running on an operating system of the computer device.

11. The system of claim 1, further comprising an IPv6 communication network.

12. The system of claim 1, wherein the computer device is an image forming apparatus.

13. A method for facilitating enhanced security for a computer device by obtaining a link layer address of an IPv6 IPsec address, comprising:
capturing multicast addresses and solicited multicast addresses for one or more IPv6 IPsec addresses, each of the one or more multicast addresses and solicited multicast addresses having a computer device identifier associated therewith;

calculating the computer device identifier from each of the one or more multicast addresses and solicited multicast addresses;

storing the computer device identifier for each of the one or more multicast addresses and solicited multicast addresses;

sending a neighbor solicitation to one or more of the IPv6 IPsec addresses as a tentative target address simulating double address detection;

capturing the neighbor advertisement response from the one or more IPv6 IPsec addresses and calculating a link-layer identifier for each of the one or more IPv6 IPsec addresses;

generating a neighbor cache with the link-layer identifier for each of the one or more IPv6 IPsec addresses; and enabling IPv6 IPsec communication with the one or more IPv6 IPsec addresses using the link-layer identifier.

14. The method of claim 13, further comprising capturing the one or more multicast addresses and solicited multicast addresses in a network filter.

15. The method of claim 14, wherein the one or more multicast addresses and solicited multicast addresses is an all nodes multicast address and solicited mode multicast for the one or more IPv6 IPsec addresses, and the one or more multicast addresses and solicited multicast addresses are neighbor solicitation and neighbor advertisement packages, respectively.

16. The method of claim 15, further comprising targeting neighbor solicitation and neighbor advertisement packages with network filter; and storing the media access control identifier (MAC ID) for each of the neighbor solicitations with unspecified addresses on a neighbor cache table.

17. The method of claim 16, further comprising creating a temporary neighbor cache entry upon enabling IPsec communication between the computer device and the one or more IPv6 IPsec addresses.

18. The method of claim 17, wherein upon enabling of the IPv6 IPsec communication between the computer device and the one or more IPv6 IPsec addresses, deleting the temporary neighbor cache entry.

19. A computer program product comprising a non-transitory computer usable medium having a computer readable code embodied therein for controlling a computer device, the computer readable program code configured to cause the computer device to enhancing security for the computer device by obtaining a link layer address of a target node using neighbor discovery unspecified solicitation, the process comprising the steps of:

capturing multicast addresses and solicited multicast addresses for one or more IPv6 IPsec addresses, each of the one or more multicast addresses and solicited multicast addresses having a computer device identifier associated therewith;

calculating the computer device identifier from each of the one or more multicast addresses and solicited multicast addresses;

storing the computer device identifier for each of the one or more multicast addresses and solicited multicast addresses;

sending a neighbor solicitation to one or more of the IPv6 IPsec addresses as a tentative target address simulating double address detection;

capturing the neighbor advertisement response from the one or more IPv6 IPsec addresses and calculating a link-layer identifier for each of the one or more IPv6 IPsec addresses;

generating a neighbor cache with the link-layer identifier for each of the one or more IPv6 IPsec addresses; and enabling IPv6 IPsec communication with the one or more IPv6 IPsec addresses using the link-layer identifier.

20. The computer program product of claim 19, further comprising capturing the multicast addresses and solicited multicast addresses for the one or more IPv6 IPsec addresses in a network filter.

21. The computer program product of claim 20, wherein the multicast address and solicited multicast addresses is an all nodes multicast address and solicited mode multicast for each of the one or more IPv6 IPsec addresses, and the multicast addresses and solicited multicast addresses are neighbor solicitation and neighbor advertisement packages, respectively.

22. The computer program product of claim 21, further comprising targeting neighbor solicitation and neighbor advertisement packages with the network filter; and storing the media access control identifier (MAC ID) for each of the neighbor solicitations with unspecified addresses on a neighbor cache table.

23. The computer program product of claim 22, further comprising creating a temporary neighbor cache entry upon enabling IPv6 IPsec communication between the computer device and the one or more IPv6 IPsec addresses.

24. The computer program product of claim 23, wherein upon enabling of the IPv6 IPsec communication between the computer device and the one or more IPv6 IPsec addresses, deleting the temporary neighbor cache entry.

* * * * *